US010695987B2

(12) United States Patent
Hughes

(10) Patent No.: US 10,695,987 B2
(45) Date of Patent: Jun. 30, 2020

(54) LOBULAR CONNECTION FOR TUBULARS

(71) Applicant: Intrinsic Energy Technology, LLC, Edmond, OK (US)

(72) Inventor: William James Hughes, Highlands Ranch, CO (US)

(73) Assignee: Intrinsic Energy Technology, LLC, Edmond, OK (US)

( * ) Notice: Subject to any disclaimer, the term of this patent is extended or adjusted under 35 U.S.C. 154(b) by 0 days.

(21) Appl. No.: 16/420,877

(22) Filed: May 23, 2019

(65) Prior Publication Data
US 2019/0366649 A1 Dec. 5, 2019

Related U.S. Application Data

(60) Provisional application No. 62/678,012, filed on May 30, 2018.

(51) Int. Cl.
| | | |
|---|---|---|
| *F16L 25/01* | (2006.01) | |
| *B29C 65/00* | (2006.01) | |
| *H01R 13/52* | (2006.01) | |
| *B29C 65/34* | (2006.01) | |

(52) U.S. Cl.
CPC .... *B29C 66/24249* (2013.01); *B29C 65/3452* (2013.01); *F16L 25/01* (2013.01); *H01R 13/5221* (2013.01)

(58) Field of Classification Search
CPC ......... F16L 15/08; F16L 25/01; E21B 17/003; E21B 17/023; E21B 17/028; E21B 17/03; E21B 17/043; E21B 17/0423; E21B 17/0426
See application file for complete search history.

(56) References Cited

U.S. PATENT DOCUMENTS 3,126,214 A * 3/1964 Wong et al. .......... F16L 15/006
 285/148.11
3,623,753 A * 11/1971 Henry .................. E21B 17/043
 285/330

(Continued)

FOREIGN PATENT DOCUMENTS

JP 06-020525 3/1994
JP 2001-200685 7/2001

OTHER PUBLICATIONS

PCT International Search Report and Written Opinion of the International Searching Authority, or the Declaration for PCT/US2019/034337, dated Sep. 24, 2019.

*Primary Examiner* — David Bochna
(74) *Attorney, Agent, or Firm* — Dunlap Codding, P.C.

(57) ABSTRACT

A tool joint connection includes a first tool joint and a second tool joint. The first tool joint has a male connector portion with a lobed polygonal profile extending longitudinally from one end of the first tool joint toward an opposing end thereof. The second tool joint has a female connector portion having a lobed polygonal profile extending longitudinally from one end of the second tool joint toward an opposing end thereof. The lobed polygonal profile of the male connector portion corresponds to the lobed polygonal profile of the female so the male connector portion of the first tool joint is non-rotatably receivable in the female connector portion of the second tool joint to form a connection between the first tool joint and the second tool joint.

13 Claims, 15 Drawing Sheets

(56) References Cited

U.S. PATENT DOCUMENTS

| | | | | |
|---|---|---|---|---|
| 3,829,816 A * | 8/1974 | Barry | E21B 17/043 | 439/191 |
| 4,206,821 A * | 6/1980 | Emmerich | E21B 17/03 | 175/315 |
| 4,690,212 A * | 9/1987 | Termohlen | E21B 17/028 | 166/65.1 |
| 5,400,861 A * | 3/1995 | Sheirer | E21B 17/03 | 175/427 |
| 6,666,274 B2 * | 12/2003 | Hughes | E21B 17/003 | 166/385 |
| 7,207,400 B2 * | 4/2007 | Bise | E21B 17/03 | 175/320 |
| 2002/0175519 A1 * | 11/2002 | Mack | F16L 15/08 | 285/330 |
| 2003/0166418 A1 * | 9/2003 | Wentworth | E21B 17/043 | 464/18 |
| 2004/0003945 A1 | 1/2004 | Springer | | |
| 2005/0022999 A1 * | 2/2005 | Hughes | E21B 17/028 | 166/380 |
| 2005/0023831 A1 * | 2/2005 | Hughes | E21B 17/028 | 285/330 |
| 2006/0267342 A1 * | 11/2006 | Boyd | E21B 17/043 | 285/333 |
| 2007/0063513 A1 * | 3/2007 | Boyd | E21B 17/043 | 285/355 |
| 2010/0012379 A1 * | 1/2010 | Wentworth | E21B 17/043 | 175/53 |
| 2011/0180273 A1 * | 7/2011 | Hughes | E21B 17/028 | 166/380 |
| 2012/0012301 A1 * | 1/2012 | Hughes | E21B 17/028 | 166/65.1 |
| 2013/0146305 A1 * | 6/2013 | Dupal | E21B 17/043 | 166/380 |
| 2014/0055278 A1 * | 2/2014 | Chau | E21B 17/028 | 340/854.4 |
| 2015/0176341 A1 * | 6/2015 | Hughes | E21B 17/028 | 166/65.1 |
| 2016/0201404 A1 | 7/2016 | Morrow | | |
| 2017/0218705 A1 | 8/2017 | Nkwocha | | |
| 2018/0258717 A1 * | 9/2018 | Liess | E21B 17/028 | |

\* cited by examiner

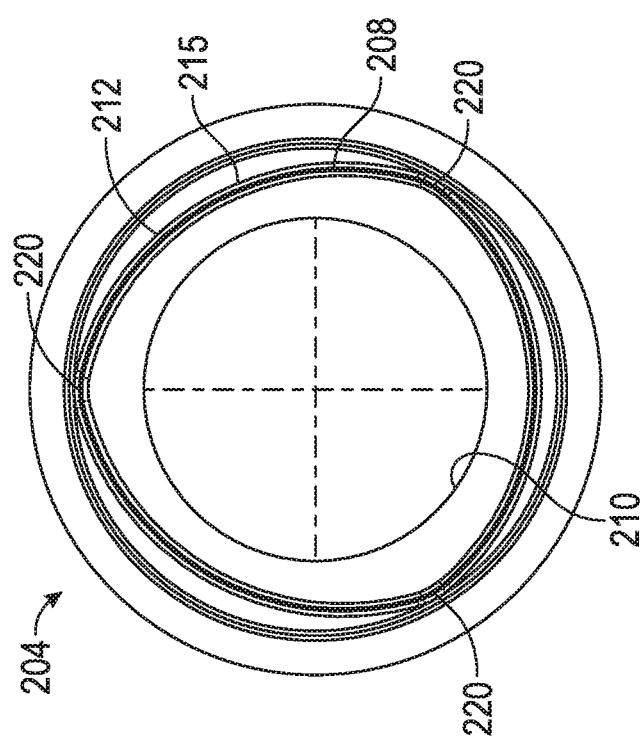
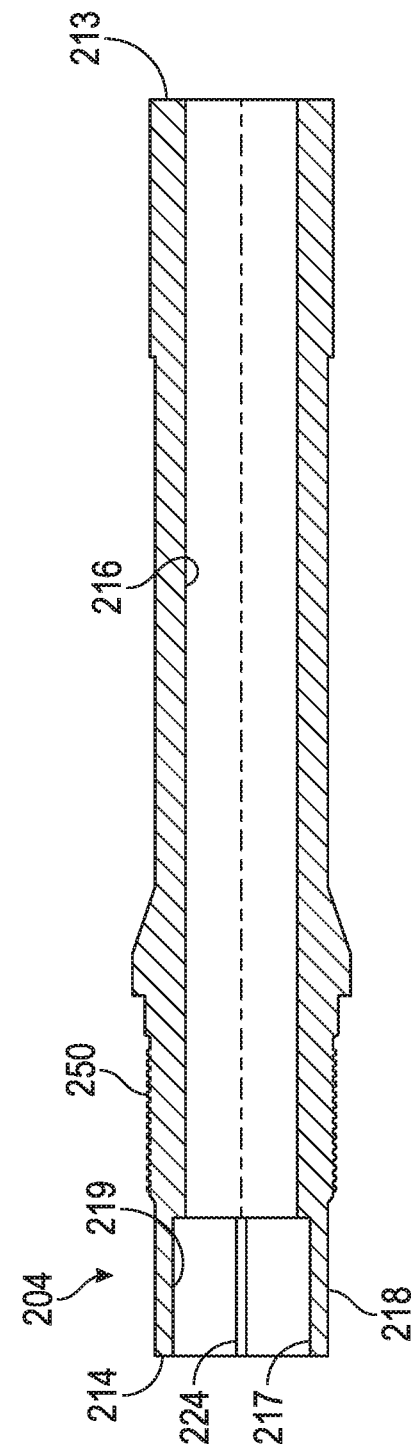
FIG. 3B
FIG. 4A

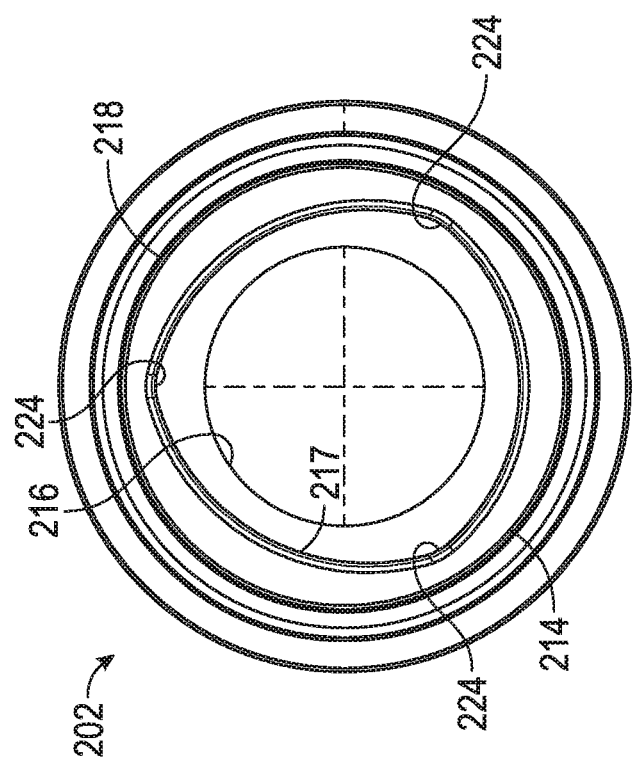
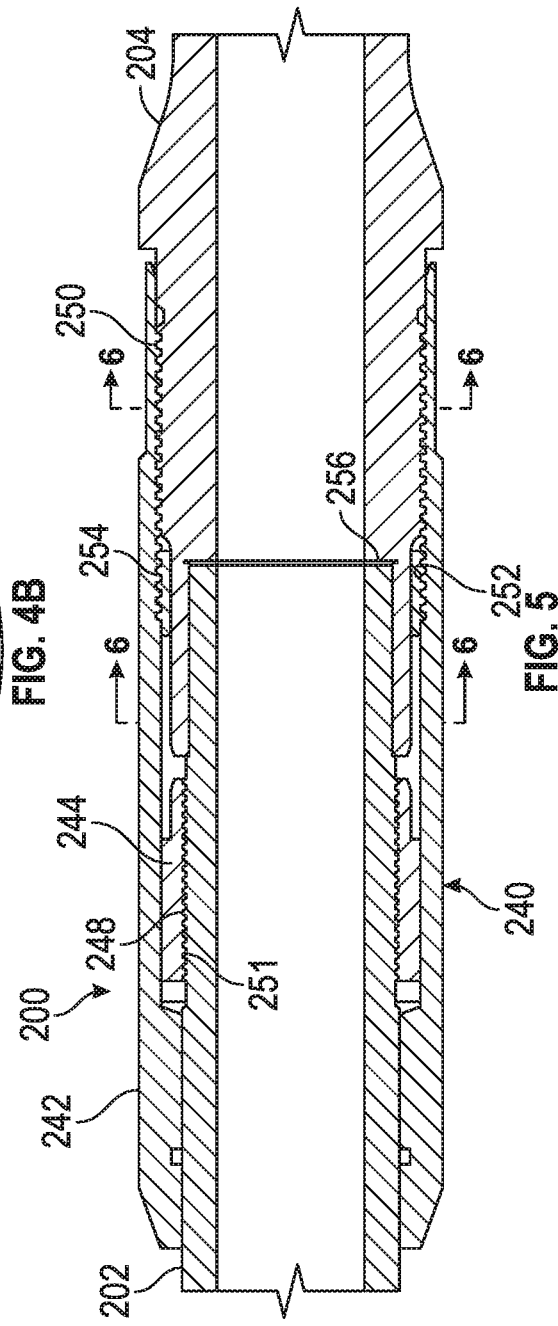
FIG. 4B
FIG. 5

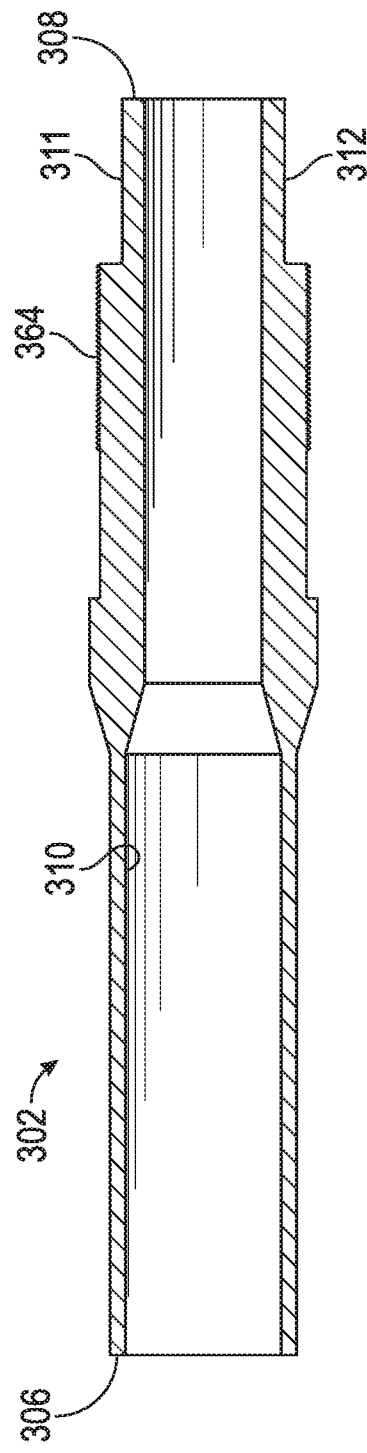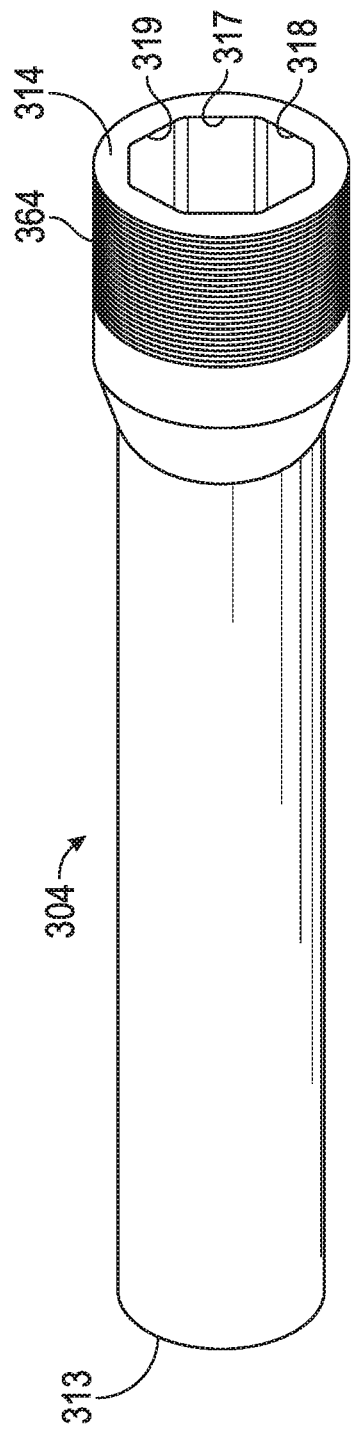

LOBULAR CONNECTION FOR TUBULARS

This application claims the benefit of U.S. Provisional Application No. 62/678,012, filed on May 30, 2018; the entire contents of which is hereby expressly incorporated herein by reference.

BACKGROUND

Large portions of hydrocarbon location and production activities involve drilling, pumping, and conduit installation beneath the surface of the earth. In addition, drilling, pumping, and conduit installation operations may include water location and distribution. Drilling, pumping, and conduit installation operations may include sewage processing and distribution. Drilling and conduit installation operations may support installation of electrical power transmission lines and telecommunication industry transmission lines.

Drilling, pumping, and conduit installation activities often require lengths of pipes. These pipes may be joined in a variety of manners. When pipes are joined, there are several considerations. For example, lengths of pipes often extend over long distances. Replacing broken connections may be difficult and timely. Also, drilling activities may require torque to be transmitted across numerous different pipes. Thus, a joint may need to be strong enough to transmit certain levels of torque and resist failure.

Additionally, certain industry standards regarding the diameters of pipe sections exist today. For example, standards exist regarding the diameters of the inside of pipes. These standards may maintain expected results for a capacity for flow through a string of joined pipes. Standards also exist for the outer diameter of pipes. These standards may maintain expectancies of certain pipes to fit within certain clearances. Thus, there may be limits on the sizes and thicknesses of materials used in the joint sections of the pipes.

Available solutions include threaded connections between pipe sections. The threads may be tightened together to form a connection between pipes. However, these connections may not transfer the same torque while rotating both to the left and to the right. The threads may become unthreaded and separate. Additional solutions include adding interlocking splines to the ends of joint sections. The splines may be capable of transferring torque between sections of pipe even while the pipes are rotated in different directions. However, spline connections may not produce desired results for strength in a pipe section. Splines do not endure reactive torque, which leads to wear from "backlash."

A need exists for an improved connection for tubulars that overcomes the issues discussed above. It is to such a connection that the inventive concepts disclosed herein are directed.

BRIEF DESCRIPTION OF THE DRAWINGS

FIG. 3B is an end view of the female tool joint of FIG. 3A.

FIG. 4A is a cross-sectional view of the male tool joint of FIG. 2.

FIG. 4B is an end view of the male tool joint of FIG. 4A.

FIG. 5 is a cross-sectional view illustrating the male tool joint and the female tool joined with a coupling.

FIG. 14B is cross-sectional view of the male tool joint of FIG. 14A.

FIG. 15A is a perspective view of the female tool joint of FIG. 13.

DETAILED DESCRIPTION OF EXEMPLARY EMBODIMENTS

Figure 1A:
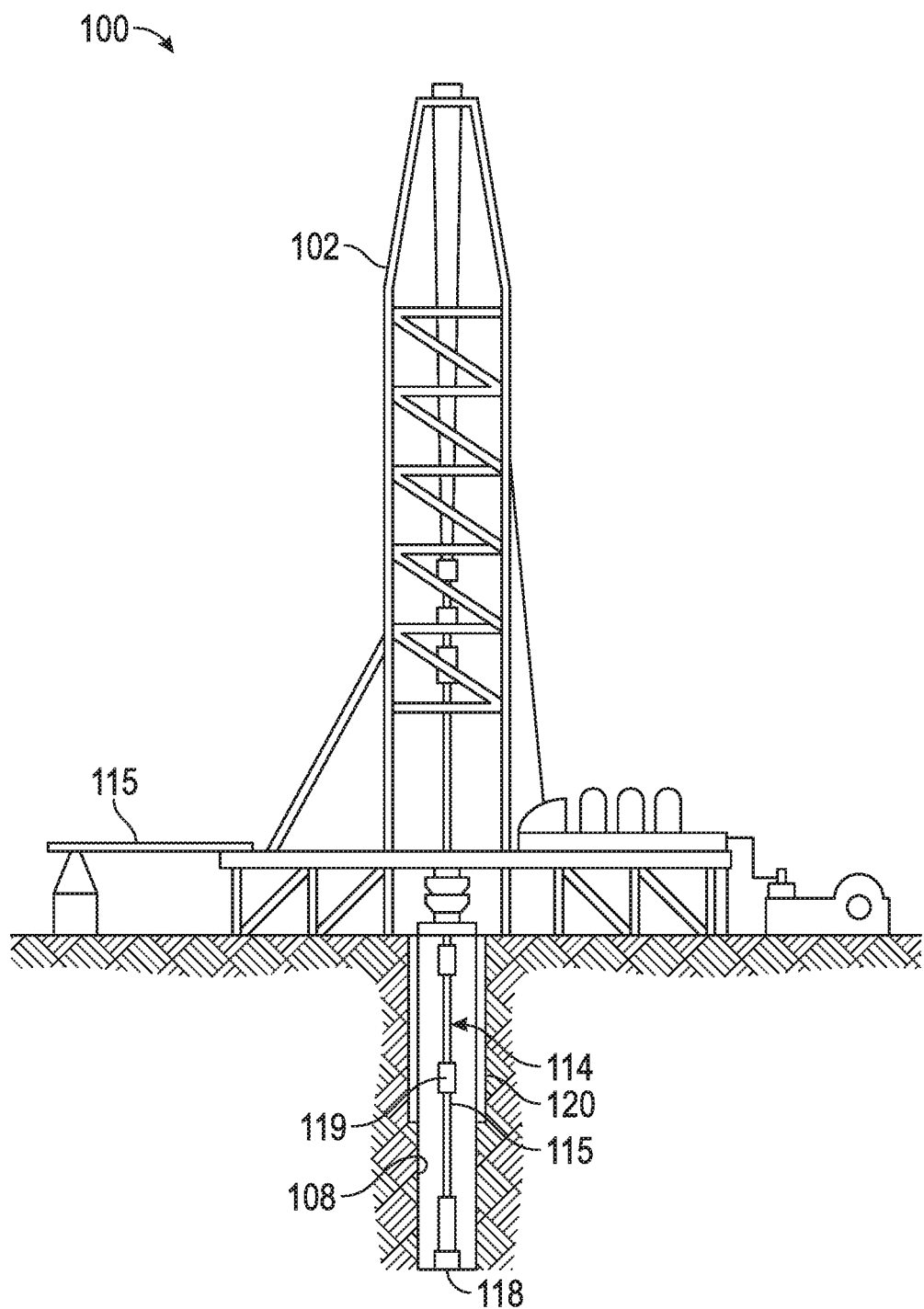
FIG. 1A is a partial cross section, elevational view of a drilling rig illustrating a hydrocarbon drilling environment in accordance with the inventive concepts disclosed herein.

The inventive concepts disclosed are generally directed to a tool joint connection that includes a first tool joint and a second tool joint. The first tool joint has a first end connectable to a first pipe body, a second end, a bore extending entirely through the first tool joint from the first end to the second end, and a male connector portion having a lobed polygonal profile extending longitudinally from the second end of the first tool joint toward the first end thereof. The second tool joint has a first end connectable to a second pipe body, a second end, a bore extending entirely through the second tool joint from the first end to the second end, and a female connector portion having a lobed polygonal profile extending longitudinally from the second end of the second tool joint toward the first end thereof. The lobed polygonal profile of the male connector portion corresponds to the lobed polygonal profile of the female connector portion so the male connector portion of the first tool joint is non-rotatably receivable in the female connector portion of the second tool joint to form a connection between the first tool joint and the second tool joint.

In another version, the inventive concepts disclosed are directed to a joint comprising a pipe body, a first tool joint extending from one end of the pipe body, and a second tool joint extending from an opposing end of the pipe body. The first tool joint has a male connector portion with a lobed polygonal profile extending longitudinally from a distal of the first tool joint toward the body. The second tool joint has a female connector portion with a lobed polygonal profile extending longitudinally from a distal end of the second tool joint toward the body. The lobed polygonal profile of the male connector portion corresponds to the lobed polygonal profile of the female connector portion so the male connector portion of the first tool joint is non-rotatably receivable in the female connector portion of a second tool joint of a like joint to form a connection between the joints.

The inventive concepts are also directed to a tubular string comprising a plurality of tubular joints. Each of the tubular joints comprises a pipe body, a first tool joint extending from one end of the pipe body, and a second tool joint extending from an opposing end of the pipe body. The first tool joint has a male connector portion with a lobed polygonal profile extending longitudinally from a distal of the first tool joint toward the body. The second tool joint has a female connector portion with a lobed polygonal profile extending longitudinally from a distal end of the second tool joint toward the body. The lobed polygonal profile of the male connector portion corresponds to the lobed polygonal profile of the female connector portion so the male connector portion of the first tool joint of one tubular joint is non-rotatably received in the female connector portion of the second tool joint of another tubular joint to form a connection between the first tool joint of the one tubular joint and the second tool joint of the other tubular joint.

In yet another version, the inventive concepts disclosed are directed to a tubular joint comprising a pipe body having a first end and a second end with the first end having a male connector portion with a lobed polygonal profile extending longitudinally from the first end of the pipe body toward the second end thereof, and the second end having a male connector portion with a lobed polygonal profile extending longitudinally from the second end of the pipe body toward the first end thereof. A first tool joint has a first end with a male connector portion and a second end with a female connector portion. The female connector portion of the second end of the first tool joint has a lobed polygonal profile extending longitudinally from the second end of the first tool joint toward the first end of the first tool joint. The lobed polygonal profile of the female connector portion of the first tool joint corresponds to the lobed polygonal profile of the male connector portion of the first end of the pipe body and the male connector portion on the first end of the pipe body is non-rotatably received in the female connector portion of the first tool joint to form a connection between the pipe body and the first tool joint. A second tool joint has a first end with a female connector portion and a second end with a female connector portion. The female connector portion of the second end of the second joint has a lobed polygonal profile extending longitudinally from the second end of the second tool joint toward the first end of the second tool joint. The lobed polygonal profile of the female connector portion of the second tool joint corresponds to the lobed polygonal profile of the male connector portion of the second end of the pipe body, and the male connector portion on the second end of the pipe body is non-rotatably received in the female connector portion of the second tool joint to form a connection between the pipe body and the second tool joint.

Before explaining at least one embodiment of the inventive concepts disclosed, it is to be understood that the inventive concepts are not limited in their application to the details of construction and the arrangement of the components or steps or methodologies in the following description or illustrated in the drawings. The inventive concepts disclosed are capable of other embodiments or of being practiced or carried out in various ways. Also, it is to be understood that the phraseology and terminology employed is for description only and should not be regarded as limiting the inventive concepts disclosed and claimed herein.

In this detailed description of embodiments of the inventive concepts, numerous specific details are set forth in order to provide a more thorough understanding of the inventive concepts. However, it will be apparent to one of ordinary skill in the art that the inventive concepts within the disclosure may be practiced without these specific details. In other instances, well-known features may not be described to avoid unnecessarily complicating the disclosure.

Further, unless stated to the contrary, "or" refers to an inclusive "or" and not to an exclusive "or." For example, a condition A or B is satisfied by anyone of: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concepts disclosed. This description should be read to include one or at least one and the singular also includes the plural unless it is obvious that it is meant otherwise.

As used herein any reference to "one embodiment" or "an embodiment" means that a particular element, feature, structure, or characteristic described in the embodiment is included in at least one embodiment. The appearances of the phrase "in one embodiment" in various places in the specification are not necessarily all referring to the same embodiment.

Figure 1B:
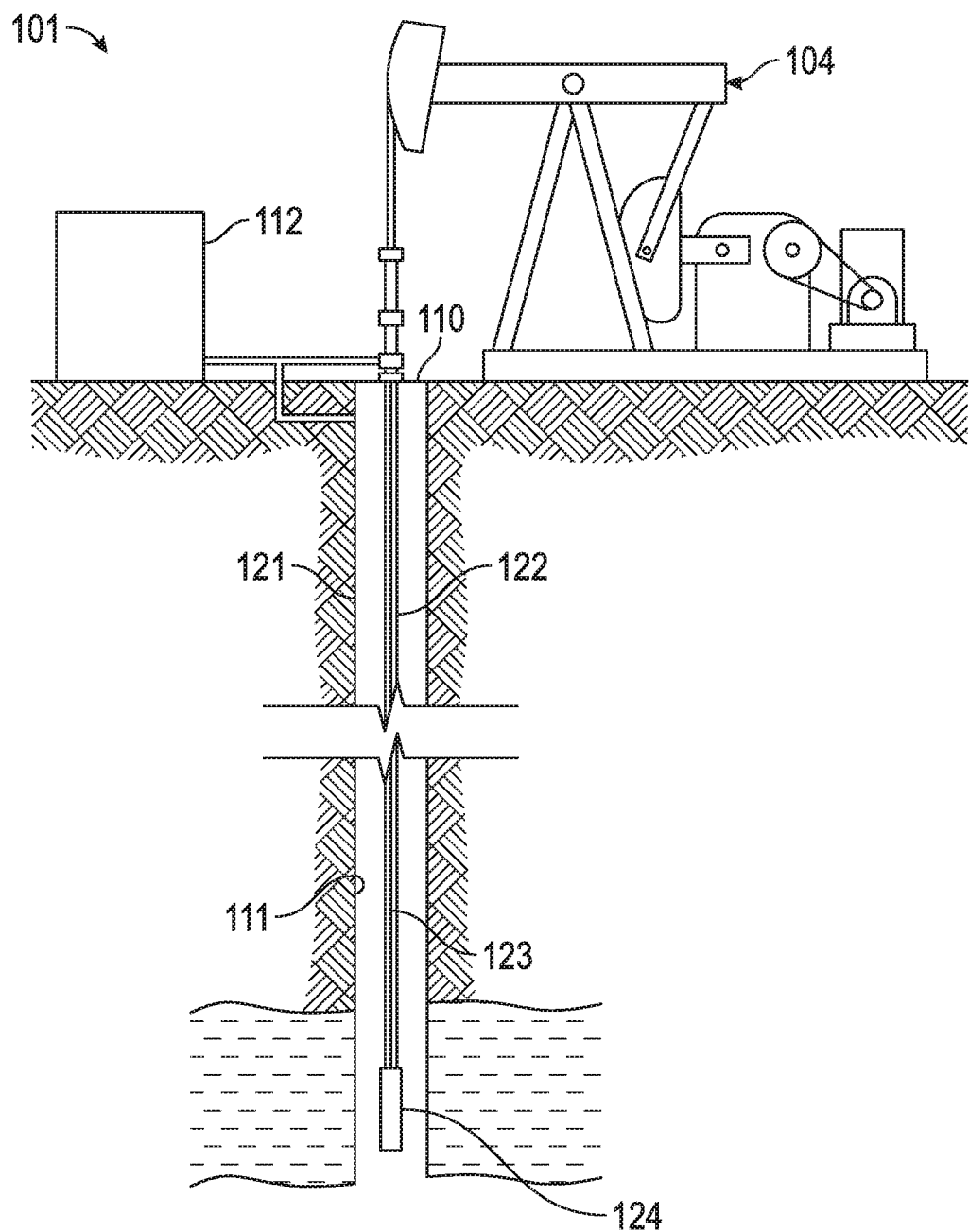
FIG. 1B is a partial cross sectional, elevational view of a pump assembly illustrating a hydrocarbon production environment in accordance with the inventive concepts disclosed herein.
Figure 2:
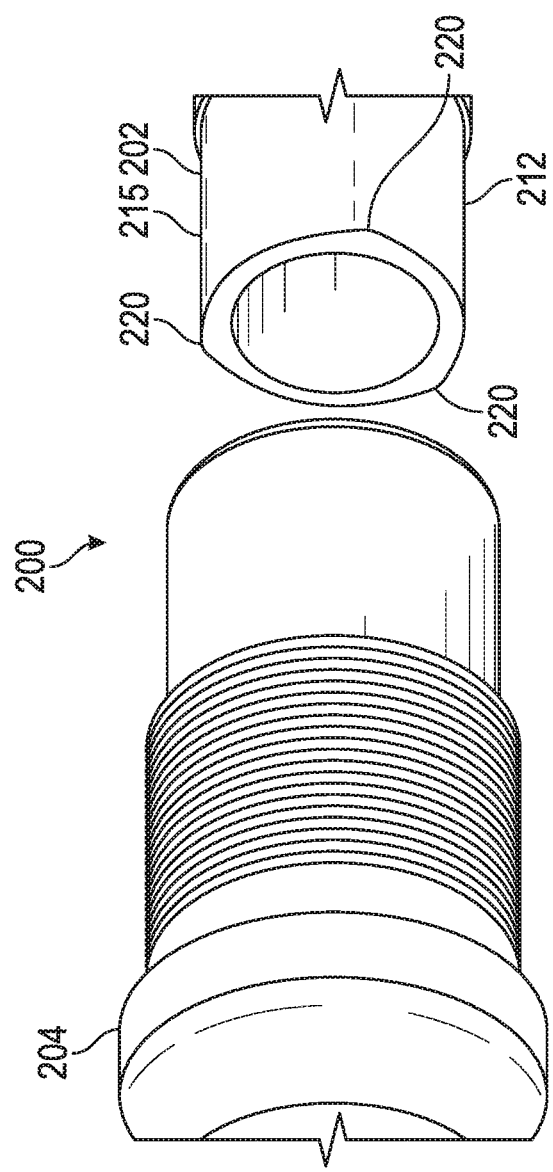
FIG. 2 is an exploded, perspective view of a male tool joint and a female too joint a tool joint constructed in accordance with the inventive concepts disclosed herein.

Referring now to the drawings, and more particularly to FIGS. 1A and 1B, FIG. 1A illustrates a hydrocarbon drilling environment in accordance with the inventive concepts disclosed herein. In this illustrative example, a hydrocarbon drilling environment 100 includes a drilling derrick 102 and a borehole 108. The drilling derrick 102 supports a drill string 114 and a drill bit 118 to form the borehole 108, which is lined with a casing string 120. The drill string 114 and the casing string 120 may include a plurality of joints of drill pipe 115 and casing connected end to end using connectors 119.

Referring to FIG. 1B, an illustration of a hydrocarbon production environment 101 is depicted in accordance with the inventive concepts disclosed herein. In this illustrative example, the hydrocarbon production environment 101 includes a pump jack 104, a borehole 111, a storage center 112, a casing string 121, and a tubing string 122 to produce hydrocarbons, such as oil and gas, from the borehole 111. The pump jack 104 supports a sucker rod string 123 for operating a pump 124.

The drill string 114, the casing string 120 and 121, the tubing string 122, and the sucker rod string 123 can be formed of individual sections call "joints." Use of the term "joint" or "joints" is intended to include without limitation a piece of drill pipe, casing, tubing, production tubing, sucker rod (solid and hollow), liners, and/or any other cylindrical device for use in wellbores for the production of hydrocarbons. In addition, the use of the term "joint" or "joints" is intended to include, without limitation, cylindrical devices for drilling, pumping, and conduit installation operations to support water location and distribution, sewage processing and distribution, installation of electrical power transmission lines, and installation of telecommunication industry transmission lines.

A joint of drill pipe can be formed in a variety of ways. In one version, the joint of drill pipe is forged from a single piece of material with a first tool joint having a male connector portion extending from one end of a pipe body and a second tool joint having a female connector portion or a male connector portion extending from an opposing end of the pipe body. In another version, the joint of drill pipe includes a pipe body, a first tool joint connected to one end of a pipe body and having a bore extending therethrough and a male connector portion; and a second tool joint connected to an opposing end of the pipe body and having a bore extending therethrough and a female connector portion. Numerous methods are known for connecting a tool joint to an end of a pipe body. Some of these include inertia welding, induction shrink fitting, and engineering and interference fit.

The illustrative embodiments provide a connection for cylindrical and tubular joints, such as drill pipe, casing, tubing, and sucker rods. Referring to FIGS. 2-6, a tool joint connection 200 is illustrated. The tool joint connection 200 includes a first tool joint 202 and a second tool joint 204. The first tool joint 202 and the second tool joint 204 may be portions of cylindrical objects, such as for example, without limitation, a drill pipe, tubing, casing, a sucker rod, a liner, and/or any other objects suitable for production and/or location of hydrocarbons. Additionally, the first tool joint 202 and the second tool joint 204 may be implemented in a hydrocarbon drilling environment or hydrocarbon production environment, such as hydrocarbon drilling environment 100 in FIG. 1A and hydrocarbon production environment 101 in FIG. 1B. Persons skilled in the art recognize that other environments exist in which connection 200 may be implemented. Such other environments may include, for example, drilling, pumping, and conduit installation environments in which drilling, pumping, and conduit installation operations support water location and distribution, sewage processing and distribution, installation of electrical power transmission lines, and installation of telecommunication industry transmission lines.

Figure 3A:
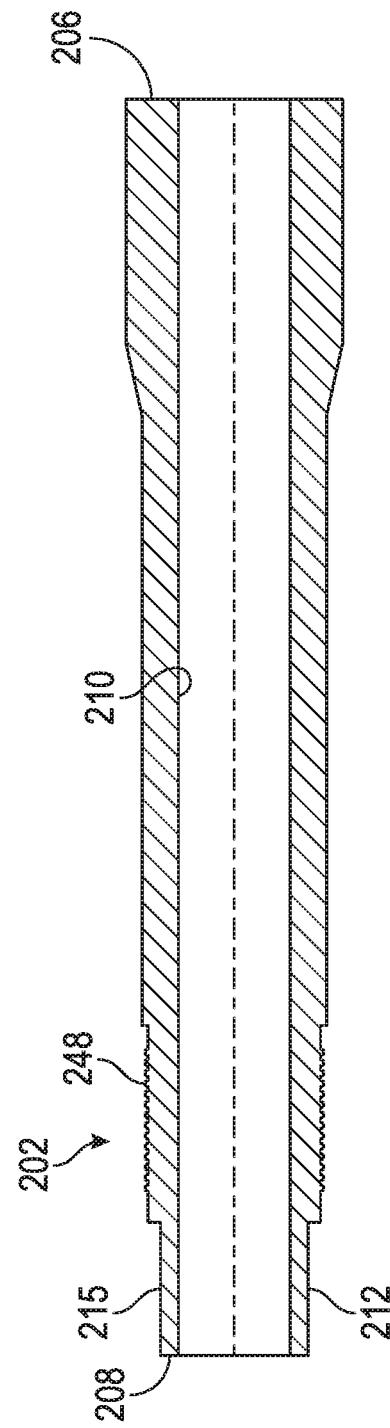
FIG. 3A is a cross-sectional view of the female tool joint of FIG. 2.

Referring to FIGS. 3A and 3B, the first tool joint 202 has a first end 206 connectable to a first pipe body, a second end 208, a bore 210 extending entirely through the first tool joint 202 from the first end 206 to the second end 208, and a male connector portion 212 having a lobed polygonal profile 215 extending longitudinally from the second end 208 of the first tool joint 202 toward the first end 206 thereof.

Referring to FIGS. 4A and 4B, the second tool joint 204 has a first end 213 connectable to a second pipe body, a second end 214, a bore 216 extending entirely through the second tool joint 204 from the first end 213 to the second end 214, and a female connector portion 218 defining a bore section 217 with a lobed polygonal profile 219 extending longitudinally from the second end 214 of the second tool joint 204 toward the first end 213 thereof.

Figure 6:
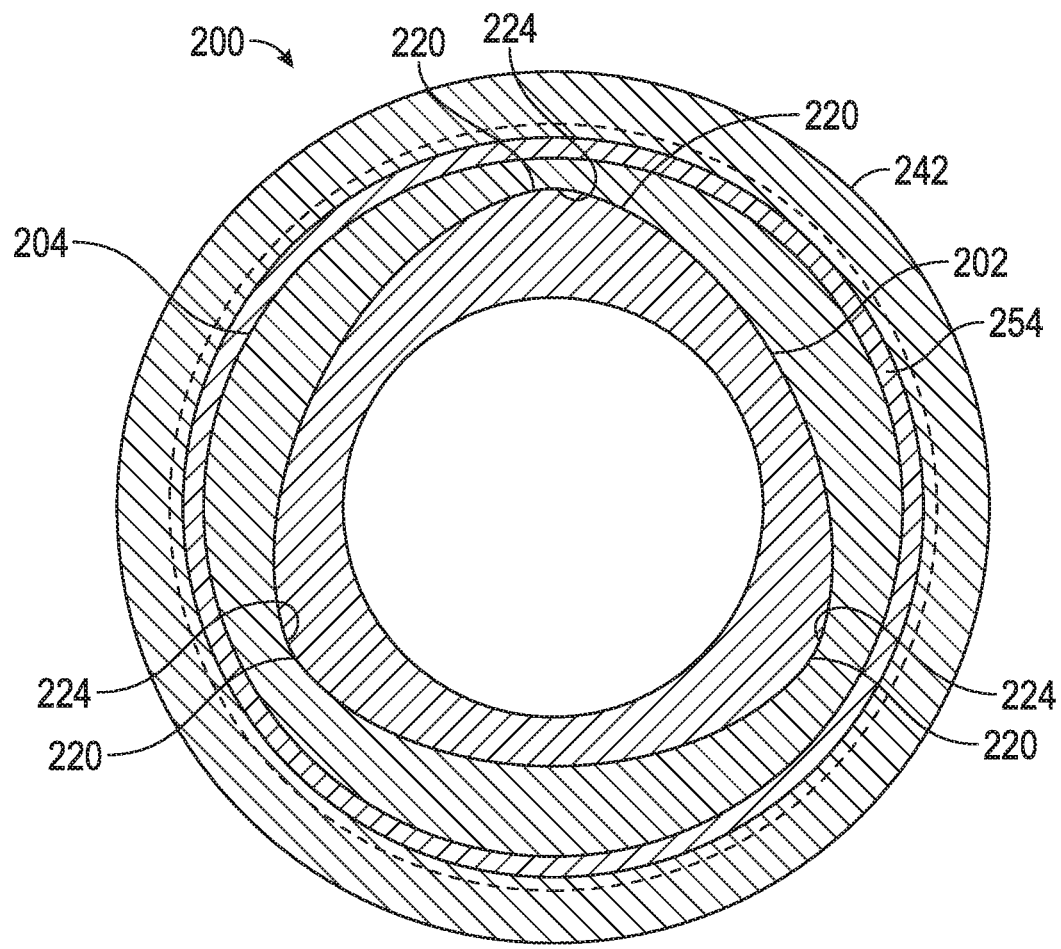
FIG. 6 is a cross section taken along line 6-6 of FIG. 5.

The lobed polygonal profile 215 of the male connector portion 212 corresponds to the lobed polygonal profile 219 of the female connector portion 218 so the male connector portion 212 of the first tool joint 202 is non-rotatably receivable in the female connector portion 218 of the second tool joint 204 to form a connection between the first tool joint 202 and the second tool joint 204 (FIGS. 5 and 6).

In one exemplary embodiment, the lobed polygonal profile 215 of the first tool joint 202 includes a plurality of lobes 220. As used herein, lobes, when referring to cylindrical objects, are curved, raised surfaces on a portion of a circumferential surface of the cylindrical object. The lobes 220 are spaced about the circumferential surface of the male connection portion 212 of the first tool joint 202. The lobes 220 are curvilinear in shape and extend in an axial direction of the first tool joint 202.

The female connector portion 218 of the second tool joint 204 includes a plurality of lobes 224. The lobes 224 are spaced about the circumferential surface of the female connector portion 218. The lobes 224 are curvilinear in shape and extend in an axial direction of the second tool joint 204. The shape of the lobes 224 correspond to the shape of the lobes 220.

In this illustrative embodiment, the first tool joint 202 has three lobes 220 and the second tool joint 204 has three lobes 224. As shown in FIG. 6, each lobe 220 is configured to be received in one of the lobes 224 as the male connector portion 212 and the female connector portion 218 are joined.

It will be appreciated that any number of lobes of a polygon may be used. For example, the number of lobes can be two, three, four, five, six, seven, eight or more.

Figure 7:
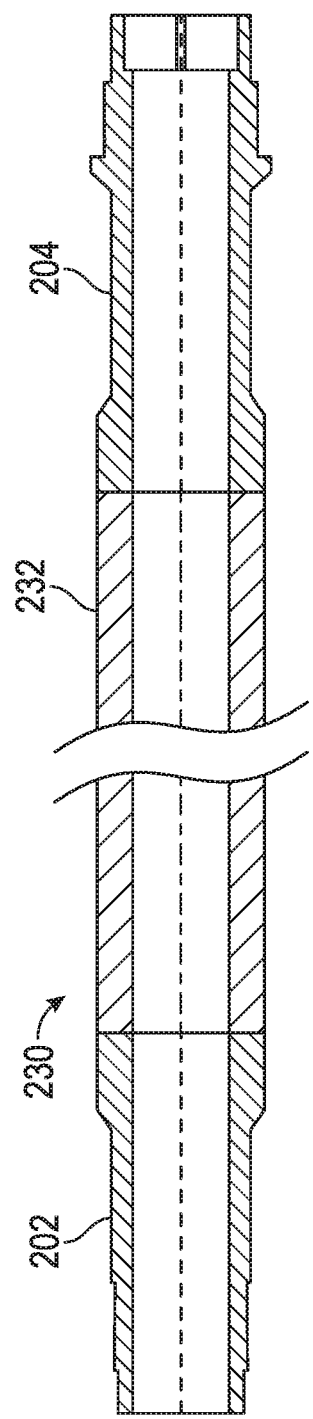
FIG. 7 is a cross-sectional view of a joint incorporating the male tool joint and the female tool joint.
Figure 8A:
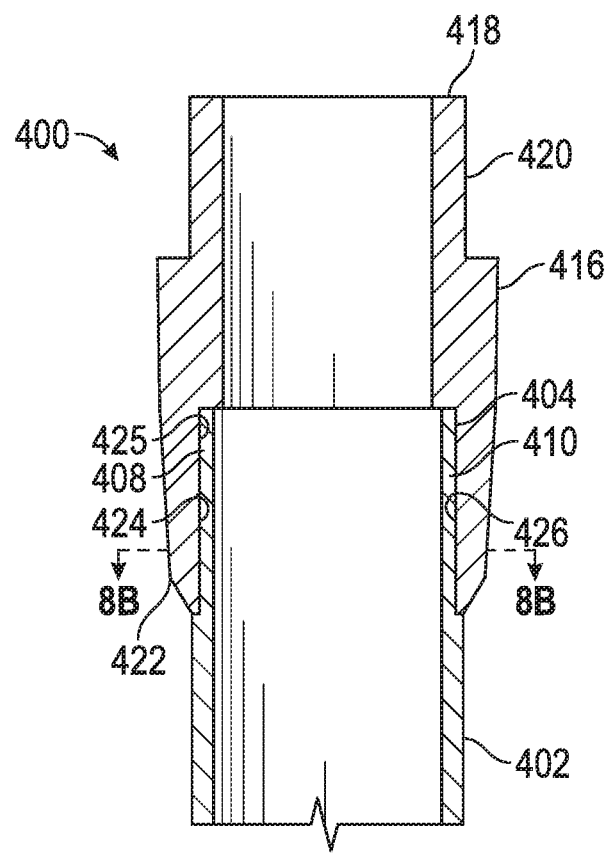
FIG. 8A is a cross-sectional view of a male tool joint shown connected to a pipe body in accordance with the inventive concepts disclosed herein.
Figure 8B:
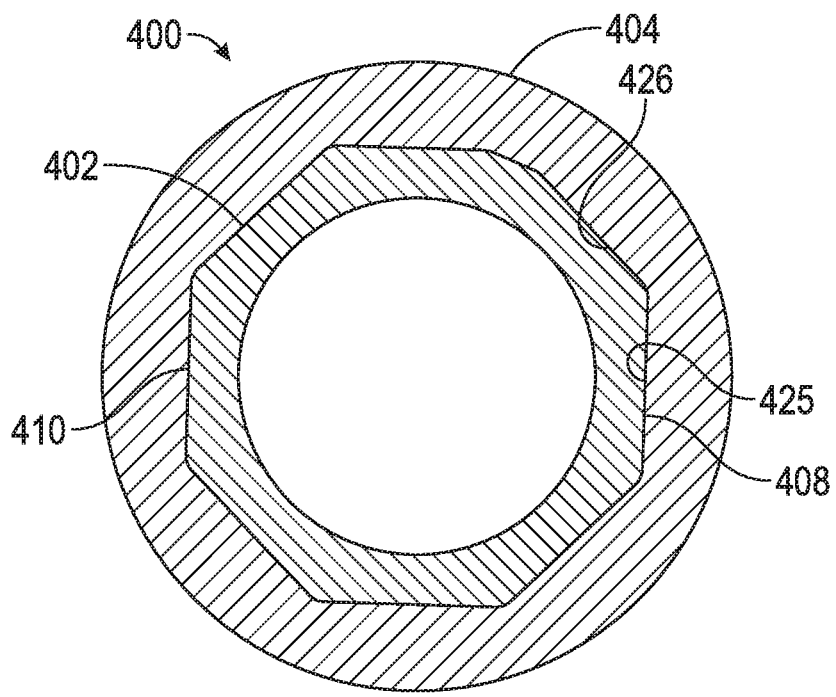
FIG. 8B is a cross-section taken along line 8B-8B of FIG. 8A.
Figure 9A:
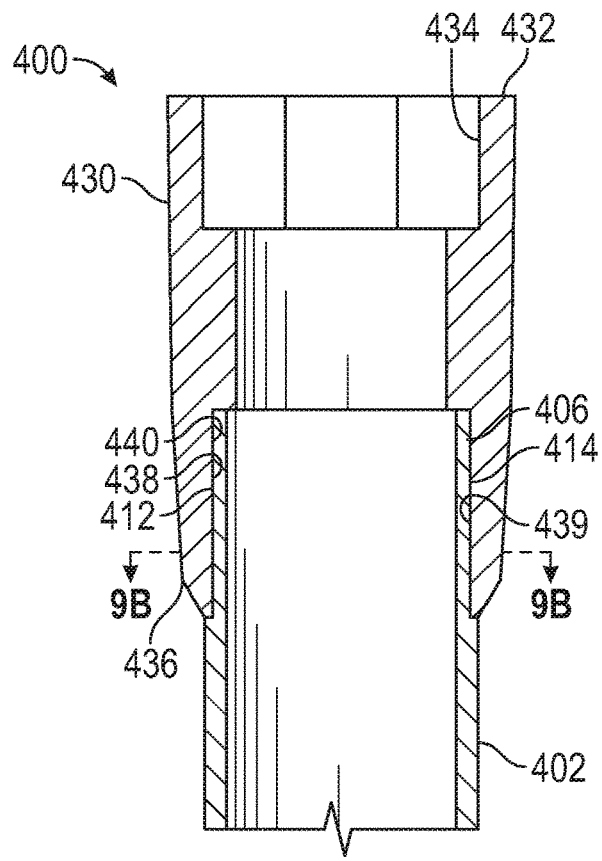
FIG. 9A is a cross-sectional view of a female tool joint shown connected to the pipe body of FIG. 8A.
Figure 9B:
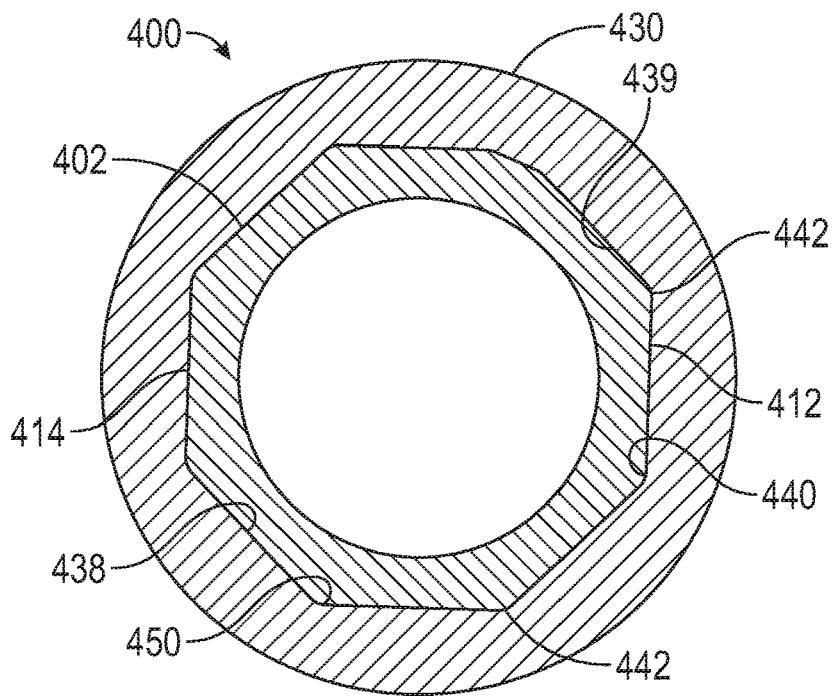
FIG. 9B is a cross-section taken along line 9B-9B of FIG. 9A.

FIG. 7 illustrates a joint 230 employing the first tool joint 202 and the second tool joint 204. The joint 230 includes a pipe body 232, the first tool joint 202 extending from one end of the pipe body 232, and the second tool joint 204 extending from an opposing end of the pipe body 232. There are numerous methods of interconnecting the tool joints to the pipe body to form a length of drill pipe. One method is a threaded shrink-grip connection as disclosed in U.S. Pat. No. 4,445,265, which is hereby incorporated herein by reference. In this method, the ends of the pipe body are threaded, forming pins. Tool joints on each end of the pipe body are provided with a threaded box into which the pins are threadingly received. Typically, the box is slightly undersized so the connection between the pin on the pipe body and the box in the tool joint cannot be made until the tool joint is heated sufficiently to cause a desired amount of thermal expansion. The tool joint, thus heated, is then threaded onto the pin of the pipe body and cooled so that, as the former cools, it shrinks onto the pipe body, forming a tight, rigid, sealed connection. As mentioned above, other methods for connecting a tool joint to an end of a pipe body include inertia welding and forming the joint as a single piece.

FIGS. 8A-9B show another method of interconnecting tool joints to the pipe body to form a joint pipe body in accordance with the inventive concepts disclosed herein. FIGS. 8A-9B show a tubular joint 400 including a pipe body 402 having a first end 400 and a second end 406. The first end 404 (FIGS. 8A and 8B) has a male connector portion 408 with a lobed polygonal profile 410 extending longitudinally from the first end 404 of the pipe body 402 toward the second end 406 thereof. The second end 406 (FIGS. 9A and 9B) has a male connector portion 412 with a lobed polygonal profile 414 extending longitudinally from the second end 406 of the pipe body 402 toward the first end 404 thereof. A first tool joint 416 (FIGS. 8A and 8B) has a first end 418 with a male connector portion 420 and a second end 422 with a female connector portion 424. The female connector portion 424 of the second end 422 of the first tool joint 416 defines a bore section 425 with a lobed polygonal profile 426 extending longitudinally from the second end 422 of the first tool joint 416 toward the first end 418 of the first tool joint 416. The lobed polygonal profile 426 of the female connector portion 424 of the first tool joint 416 corresponds to the lobed polygonal profile 410 of the male connector portion 408 of the first end 404 of the pipe body 402 and the male connector portion 408 of the pipe body 402 is non-rotatably received in the female connector portion 424 of the first tool joint 416 to form a connection between the pipe body 402 and the first tool joint 416.

A second tool joint 430 (FIGS. 9A and 9B) has a first end 432 with a female connector portion 434 and a second end 436 with a female connector portion 438. The female connector portion 438 of the second joint 430 defines a bore section 439 with a lobed polygonal profile 440 extending longitudinally from the second end 436 of the second tool joint 430 toward the first end 432 of the second tool joint 430. The lobed polygonal profile 440 of the female connector portion 438 corresponds to the lobed polygonal profile 414 of the male connector portion 412 of the second end 406 of the pipe body 402, and the male connector portion 412 on the second end 406 of the pipe body 402 is non-rotatably received in the female connector portion 438 of the second tool joint 430 to form a connection between the pipe body 402 and the second tool joint 430.

The first tool joint 416 and the second tool joint 430 may be secured to the pipe body 402 with the shrink-grip method described above, but instead of threading the tool joints on the pipe body, the tool joints are axially inserted on the ends of the pipe joint after being heated to cause a desired amount of thermal expansion. The tool joints are then cooled so that, as the former cool, they shrink onto the pipe body, forming a tight, rigid, sealed connection. This method of joining a tool joint to a pipe body may be implemented with or without the lobed polygonal profile incorporated in the first or distal ends of the tool joints.

In one exemplary embodiment, the lobed polygonal profiles 410 and 414 of the pipe body 402 include a plurality of lobes 442. The lobes 442 are spaced about the circumferential surface of the male connector portions 408 and 420 of the pipe body 402. The lobes 442 are curvilinear in shape and extend in an axial direction of the pipe body 402.

Similarly, the female connector portion 424 of the first tool joint 416 includes a plurality of lobes 446. The lobes 446 are spaced apart about the circumferential surface of the female connector portion 424. The lobes 446 are curvilinear in shape and extend in axial direction of the first tool joint 430. The shape of the lobes 446 correspond to the shape of the lobes 442.

The female connector portion 438 of the second tool joint 430 includes a plurality of lobes 450. The lobes 450 are spaced about the circumferential surface of the female connector portion 434. The lobes 450 are curvilinear in shape and extend in axial direction of the second tool joint 430. The shape of the lobes 450 correspond to the shape of the lobes 442 except the lobes.

In this illustrative embodiment, each of the pipe body 402, the first tool joint 416, and the second tool joint 430 has eight lobes. However, it will be appreciated that any number of lobes of a polygon may be used.

With reference now to FIG. 5, an illustration of a coupling assembly 240 for two tool joints to be joined is depicted in accordance with the inventive concepts disclosed herein. The coupling assembly 240 includes a coupling 242 and a load ring 244. The coupling 242 is configured to slide over the load ring 244. The coupling 244 has threads 246 on an inner surface thereof. The first tool joint 202 has threads 248, and the second tool joint 204 has threads 250. The threads 248 are configured to receive the threads 246 on the inner surface of the coupling 242.

The coupling 242 is configured to slide in the axial direction around the load ring 244. A portion of the coupling 242 has an inner diameter substantially smaller than the diameter of the load ring 244. The inner diameter is also substantially equal to the outer diameter of the first tool joint 202.

The load ring 244 has a set of inner threads 250 matched to the threads 248 on the first tool joint 202. The inner threads 251 allows the load ring 244 to be rotated onto the threads 248 on the first tool joint 202. Once in place, the load ring 244 may be secured to the first tool joint 202 and secured using set screws (not shown). Any number of set screws may be used to lock the load ring 244 in place. In alternative embodiments, the load ring 244 may be formed on the first tool joint 202. Thus, the load ring 244 and the first tool joint 202 may be the same physical part.

In this illustrative embodiment, a retaining ring 252 restricts the coupling 242 from sliding in an axial direction away from the first tool joint 202. The retaining ring 252 is positioned in the coupling 242 by engaging threads 254 of the retainer ring 252 with the threads 246 of the coupling 242 when the coupling 242 is slid over the load ring 244. Once engaged, the retaining ring 252 contacts a shoulder of the load ring 244 to restrict the coupling 242 from sliding away from the load ring 244 and the first tool joint 202.

In this example, the connection 200 also includes a seal 256. The seal 256 is configured to prevent any leakage of fluids from the connection formed between an end surface of the first tool joint 202 and an end surface of the second tool joint 204.

As the coupling 242 is shifted axially towards the second tool joint 204, a point is reached where the load ring 244 resists further axial movement of the coupling 242 towards the second tool joint 204. At this point, further tightening of the coupling 242 on threads forces the first tool joint 202 and the second tool joint 204 further together. Forcing the first tool joint 202 and the second tool joint 204 together reduces the axial distance between the first tool joint 202 and the second tool joint 204. In this example, the end of the first tool joint 202 and the end of the second tool joint 204 sealingly contact the seal 256.

The male connector portion 212 and the female connector portion 218 may be tapered. The tapered shape provides a number of advantages to the joint connection 200. First, the tip of each of the lobes is narrower than the base of the lobes. The narrower tip fits within the larger recessed areas between the lobes at an initial engagement stage. At such an initial engagement stage, a clearance exits between the narrower tip of the lobes and the larger recessed areas. The clearance allows the lobes to intermesh with no precise alignment at the initial engagement stage. Second, the area of contact between opposing lobes allows torque to be transferred between the first joint tool 202 and the second joint tool 204. Transfer of torque between the lobes allows pipes connected by the joint connection 200 to be rotated either to the right or to the left without becoming disconnected.

Figure 10:
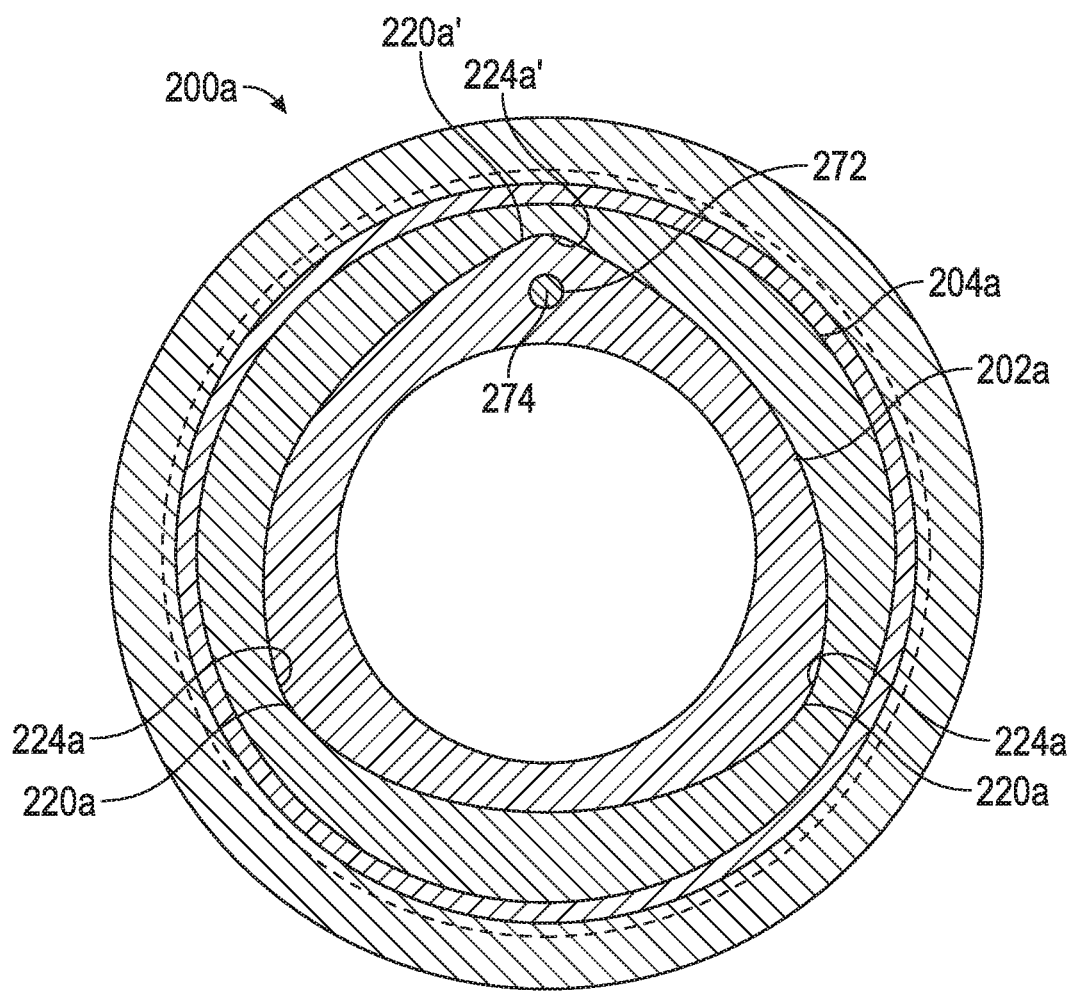
FIG. 10 is a cross-sectional view of another embodiment of a tool joint connection having a particular orientation in accordance with the inventive concept disclosed herein.
Figure 11:
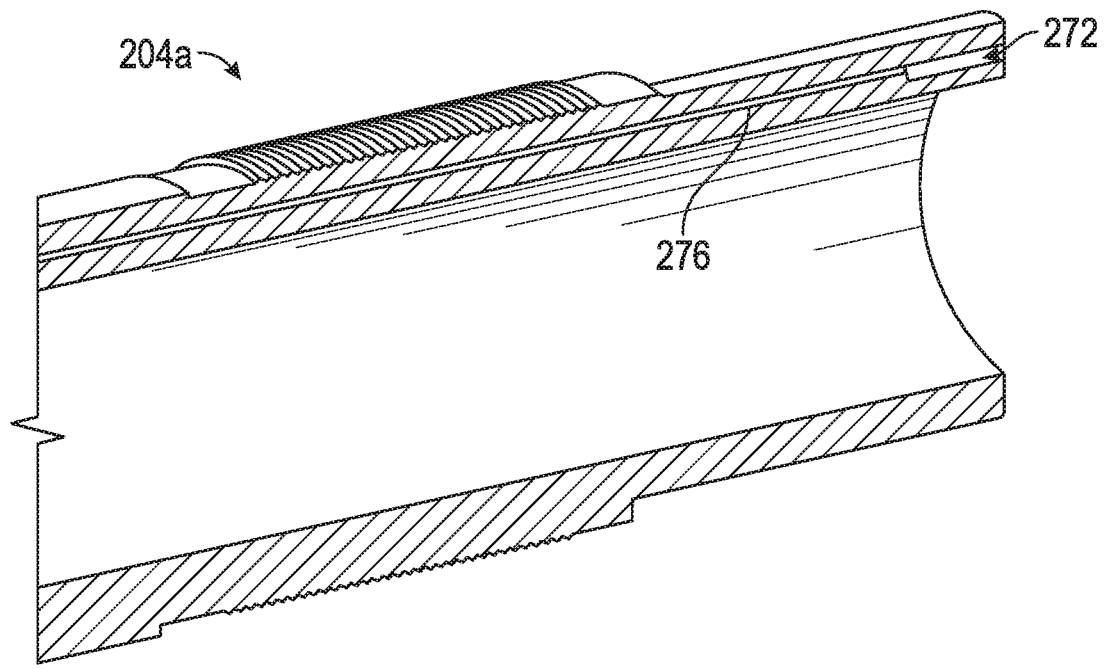
FIG. 11 is a cross-sectional view of a male tool joint having a transmission line in accordance with the inventive concepts disclosed herein.
Figure 12:
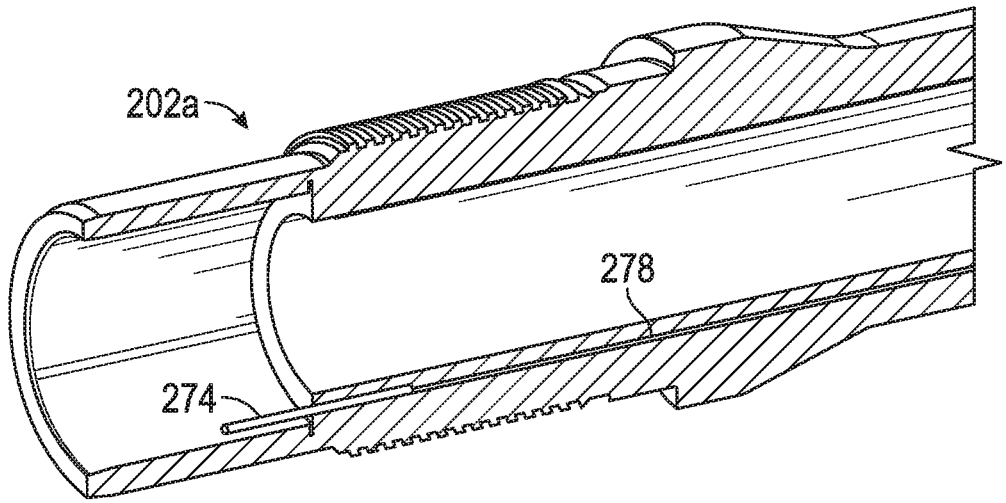
FIG. 12 is a cross-sectional view of a female tool joint having a transmission line in accordance with the inventive concepts disclosed herein.

With reference now to FIGS. 10-12, another embodiment of a joint connection 200a is illustrated. In this example, a first joint tool 202a may be a male joint tool, such as first joint tool 202 in FIG. 3A, and a second joint tool 204a may be a female joint tool, such as the second joint tool 204 in FIG. 4A.

In this illustrative embodiment, the first tool joint 202a has plurality of lobes 220a, while the second tool joint 204a has plurality of lobes 224a. The plurality of lobes 220a includes at least one lobe 220a' that differs in size or shape or both than other lobes in the plurality of lobes 220a. On the other end of the joint, the second tool joint 204a has a plurality of lobes 224a, which includes a lobe 224a' that corresponds to the lobe 224a' to provide a particular orientation for the joint.

In this illustrated embodiment, the lobe 220a' has a radius less than the radius of the other lobes 220a. However, in other embodiments, the lobe 220a' may have a radius greater than the other lobes 220a.

Referring to FIG. 11, an illustration of the second tool joint 204a having a transmission line is depicted in accordance with the inventive concepts disclosed herein. In this illustrative example, the second tool joint 204a includes a communication link 272. The second tool joint 204a may be an example of one embodiment of the second tool joint including a transmission line.

With reference now to FIG. 12, an illustration of the first tool joint 202a having a transmission line is depicted in accordance with the inventive concepts disclosed herein. In this illustrative example, the first tool joint 202a includes a communication link 274. The first tool joint 202a may be an example of one embodiment of the first tool joint including a transmission line. As depicted, the communication link 274 extends from a shoulder to be mateable with the communication link 272. FIG. 9 depicts the communication link 274 to be mated with a male electrical connector the communication link 272, which is depicted as being a female electrical connector. In this embodiment, the female electrical connector 272 is connected to an electrical wire 276, and the male electrical connection 274 is connected to an electrical wire 278. The electrical wires 276 and 278 extending along or through the tool joints 202a and 204a, respectively. Thus, electrical conductivity may be maintained through a connection of two pipes and/or as entire string of connected pipes. Additional methods and systems for including wiring in pipes are disclosed in U.S. Pat. No. 7,226,090 entitled "Rod and Tubing Joint of Multiple Orientations Containing Electrical Wiring," which is hereby incorporated herein by reference.

The illustrations of electrical wiring and electrical connections FIGS. 10-12 are not meant to imply physical or architectural limitations to how different illustrative embodiments may be implemented. Other components in addition to, and/or in place of, the ones illustrated may be used. Some components may be unnecessary in some illustrative embodiments. For example, in different illustrative embodiments any number of electrical wiring and electrical contacts may be used. For example, a joint may be configured for three-phase power, in which case three wires would extend through the joint. Electrical wiring and/or electrical contacts may be inserted into any different configuration of male and female lobes. Additionally, electrical wiring and contacts may be inserted into the walls of the pipes themselves.

Referring to FIGS. 13-18, another embodiment of a tool joint connection 300 is illustrated. The tool joint connection 300 includes a first tool joint 302 and a second tool joint 304. The first tool joint 302 and the second tool joint 304 may be portions of cylindrical objects, such as a drill pipe, tubing, casing, a liner, and/or any other objects suitable for production and/or location of hydrocarbons. Additionally, the first tool joint 302 and the second tool joint 304 may be implemented in a hydrocarbon drilling environment or hydrocarbon production environment, such as hydrocarbon drilling environment 100 in FIG. 1A and hydrocarbon production environment 101 in FIG. 1B. Persons skilled in the art recognize and take note that other environments exist in which connection 300 may be implemented. Such other environments may include, for example, drilling, pumping, and conduit installation environments in which drilling, pumping, and conduit installation operations support water location and distribution, sewage processing and distribution, installation of electrical power transmission lines, and installation of telecommunication industry transmission lines.

Figure 14A:
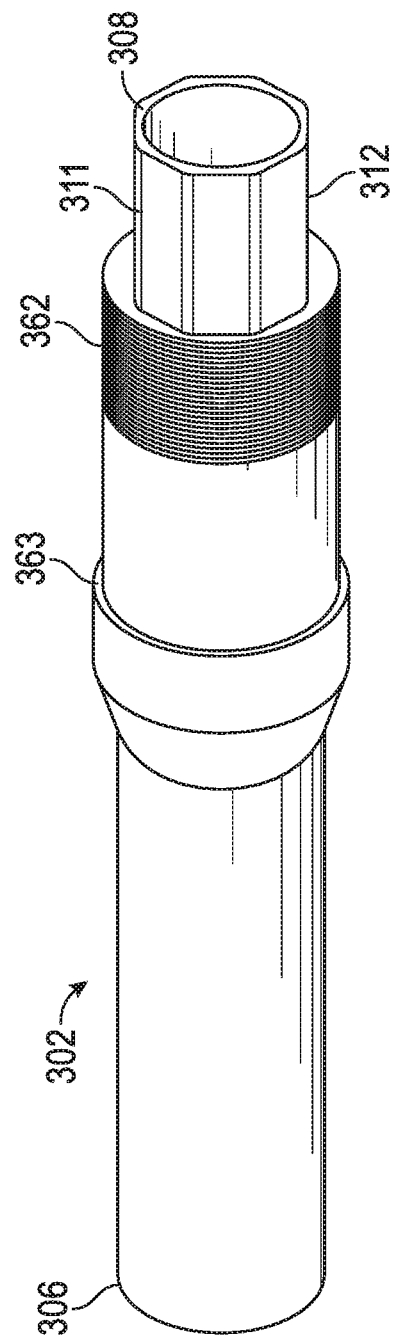
FIG. 14A is a perspective view of the male tool joint of FIG. 13.

As best shown in FIGS. 14A and 14B, The first tool joint 302 has a first end 306 connectable to a first pipe body, a second end 308, a bore 310 extending entirely through the first tool joint 302 from the first end 306 to the second end 308, and a male connector portion 312 having a lobed polygonal profile 311 extending longitudinally from the second end 308 of the first tool joint 302 toward the first end 306 thereof.

Figure 15B:
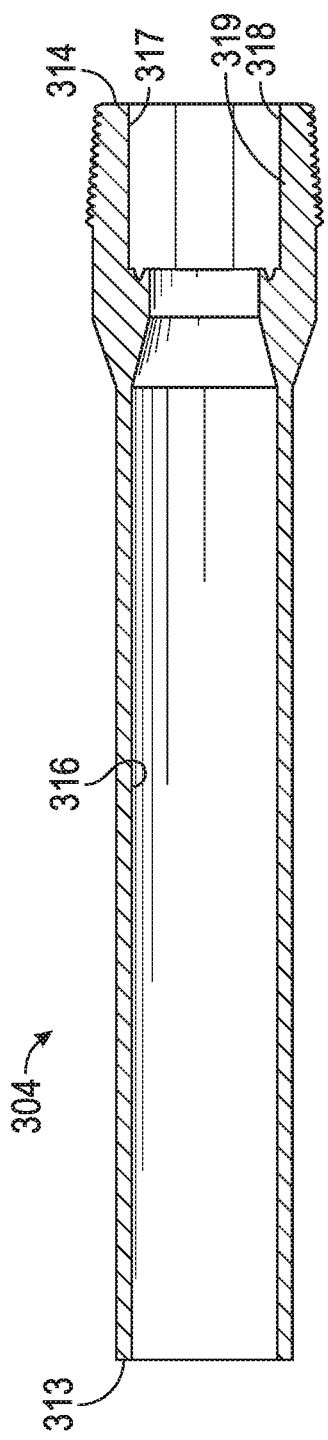
FIG. 15B is a cross-sectional view of the female tool joint of FIG. 15A.

Referring to FIGS. 15A and 15B, the second tool joint 304 has a first end 313 connectable to a second pipe body, a second end 314, a bore 316 extending entirely through the second tool joint 304 from the first end 313 to the second end 314, and a female connector portion 318 defining a bore section 317 with a lobed polygonal profile 319 extending longitudinally from the second end 314 of the second tool joint 304 toward the first end 313 thereof.

The lobed polygonal profile 311 of the male connector portion 312 corresponds to the lobed polygonal profile 319 of the female connector portion 318 so the male connector portion 312 of the first tool joint 302 is non-rotatably receivable in the female connector portion 318 of the second tool joint 304 to form a connection between the first tool joint 302 and the second tool joint 304.

Figure 17:
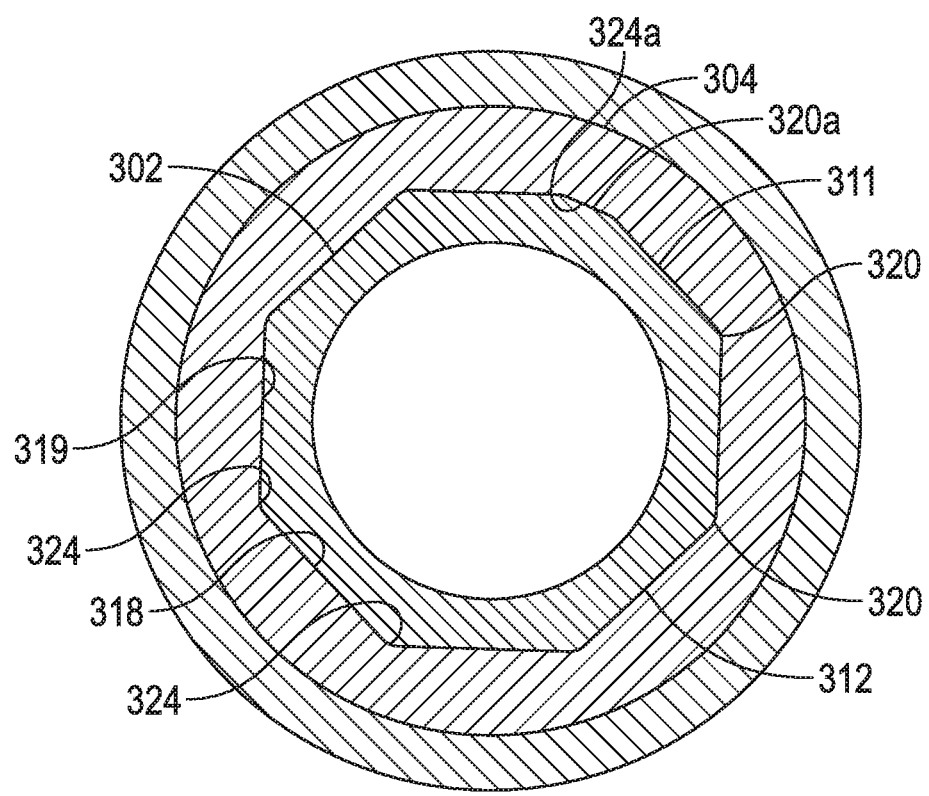
FIG. 17 is a cross-section taken along line 17-17 of FIG. 16.

In one exemplary embodiment and as best shown in FIG. 17, the lobed polygonal profile 311 of the first tool joint 302 includes a plurality of lobes 320. The lobes 320 are spaced about the circumferential surface of the male connection portion 312 of the first tool joint 302. The lobes 320 are curvilinear in shape and extend in an axial direction of the first tool joint 302.

Similarly, the lobed polygonal profile 319 of the second tool joint 304 includes a plurality of lobes 324. The lobes 324 are spaced about the circumferential surface of the female connector portion 318. The lobes 324 are curvilinear in shape and extend in an axial direction of the second tool joint 304. The shape of the lobes 324 corresponds to the shape of the lobes 320.

In this illustrative embodiment, the first tool joint 302 has eight lobes and the second tool joint 304 has eight lobes. Each lobe 320 is configured to be received in one of the lobes 324 as the first end 308 of first joint section 302 and the second end 314 of the second joint section 304 are joined. Again, it will be appreciated that any number of lobes of a polygon may be used.

In this illustrative embodiment, the lobes 320 include at least one lobe 320a that differs in size or shape or both from lobes 320. On the other end of the joint, a lobe 324a corresponding to the lobe 320a provides a particular orientation for the joint.

In this illustrated embodiment, the lobe 320a has a radius greater than the radius of the other lobes in the plurality of lobes 320. However, in other embodiments, the lobes 320a may have a radius less than the other lobes in plurality of lobes 320a.

Figure 13:
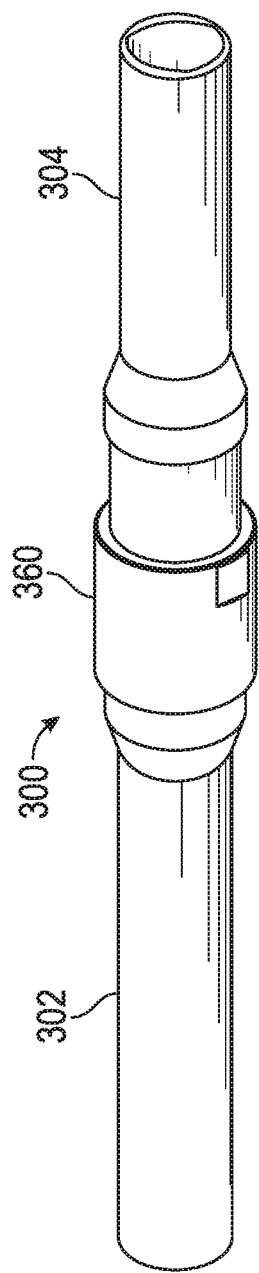
FIG. 13 is a perspective view of another embodiment of a male tool joint and a female tool joint joined with a coupling in accordance with the inventive concepts disclosed herein.
Figure 16:
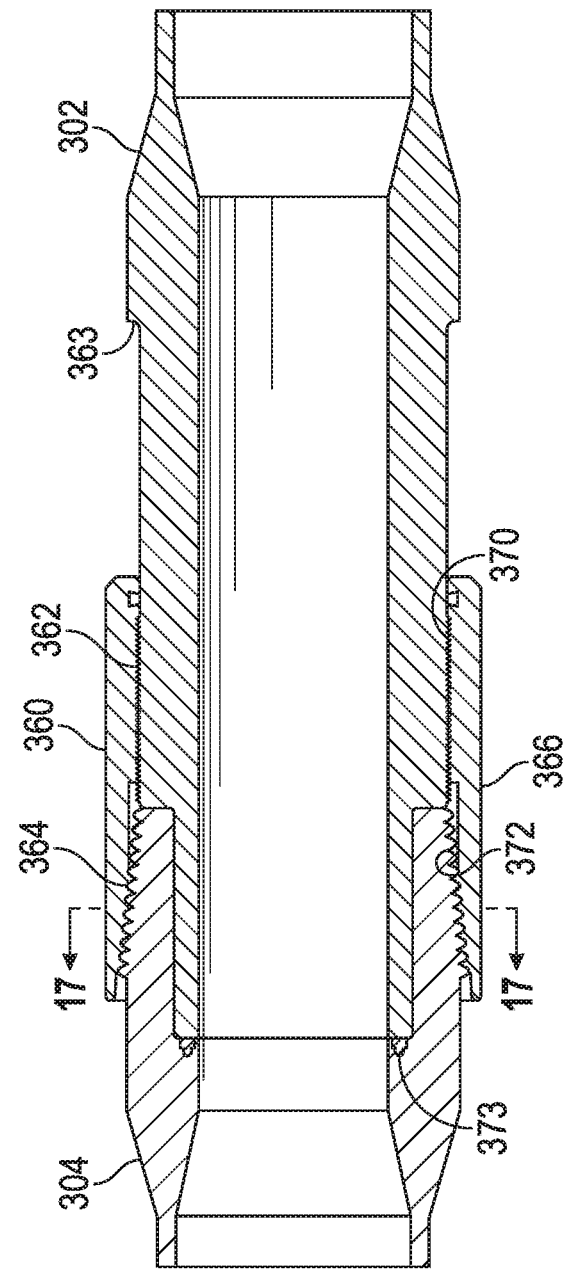
FIG. 16 is a cross-section taken along line 16-16 of FIG. 13.

With reference now to FIGS. 13 and 16, another embodiment of a coupling assembly 360 for two tool joints to be joined is depicted in accordance with an illustrative embodiment. The coupling assembly 360 is known as a "differential connection."

The first tool joint 302 is provided with a first external threaded portion 362 adjacent the male connector portion 312 and an external shoulder 363 spaced a distance from the first threaded portion 362, and the second tool joint 304 is provided with a second external threaded portion 364 adjacent the second end 314 of the second tool joint 304. The threaded portion 362 of the first tool joint 302 has a different pitch than the threaded portion 364 of the second tool joint 304. In one embodiment, the threaded portion 362 has a faster pitch than the threaded portion 364 of the second tool joint 304. For the connector shown, the threaded portion 362 may have ANSI 7°/45° buttress thread pitch 12 TPI, while the threaded portion 364 of the second tool joint 304 may have API 0.038 thread 2 in/ft taper pitch 4 TPI.

The coupling assembly 360 includes a coupling 366 having a first internal threaded portion 370 threadingly mateable with the first external threaded portion 362 of the first tool joint 302 and a second internal threaded portion 372 threadingly mateable with the second external threaded portion 364 of a like tubular joint when the male connector portion 312 of the first tool joint 302 is received in the female connector portion 318 of the like tubular joint.

Before engaging the first tool joint 302 with the second tool joint 304, a seal 373 is provided in the second tool joint 304 to sealingly engage the end of the first tool joint 302 when the first tool joint 302 is fully engaged with the second tool joint 304. The coupling 366 is threaded fully onto the first tool joint 302 until the coupling 366 contacts the shoulder 363. The first tool joint 302 and the second tool joint 304 are then engaged with one another. The first internal threaded portion 370 is threaded on the first external threaded portion 362 of the first tool joint 302 until the second internal threaded portion 364 threadingly engages the second external threaded portion 364 of the second tool joint 304. Additional rotation of the coupling 366 pulls the first tool joint 302 and the second tool joint 304, together as shown in FIG. 16.

Figure 18:
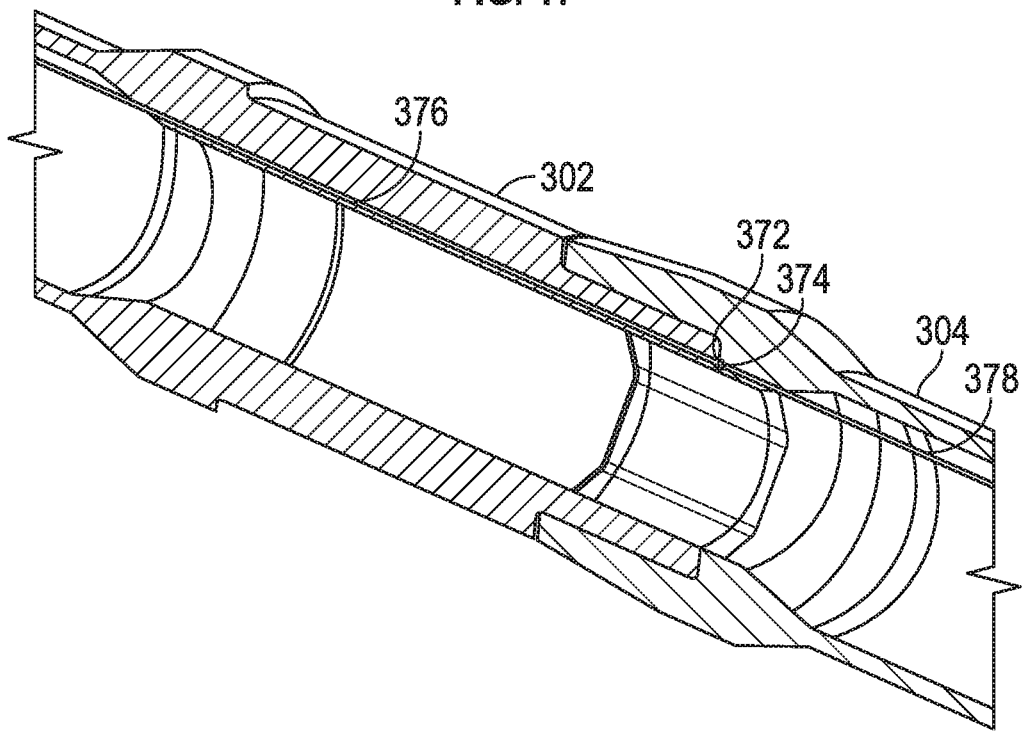
FIG. 18 is a cross-sectional view of the male tool joint and the female tool joint of FIGS. 13-17 provided with transmission lines.

Referring to FIG. 18, first tool joint 302 and the second tool joint 304 are illustrated with transmission lines incorporated therein. The first tool joint 302 includes a first communication link 372 and the second tool joint 304 includes a second communication link 374 positioned to interface with one another when the first tool joint 302 is connected to the second tool joint 304. The communication links 372 and 374 may be any communication link capable of transmitting the desired data or power. For example, the communication links 372 and 374 may be plugs or contacts for transmitting electricity, optics, or both.

The communication links 372 and 374 are illustrated as connected to transmission lines 376 and 378, respectively. The transmission lines 376 and 378 may be electric wires or optical fibers. The transmission lines 376 and 378 extended along or through the tool joints 302 and 304, respectively. Thus, electrical conductivity or data transmission may be maintained through a connection of two pipes and/or as entire string of connected pipes. Additional methods and systems for including wiring in pipes are disclosed in U.S. Pat. No. 7,226,090 entitled "Rod and Tubing Joint of Multiple Orientations Containing Electrical Wiring," which is hereby incorporated herein by reference.

From the above description, it is clear that the inventive concepts disclosed herein is well adapted to carry out the objects and to attain the advantages mentioned and those inherent in the inventive concepts disclosed herein. While preferred embodiments of the inventive concepts disclosed have been described for this disclosure, it will be understood that numerous changes may be made which will readily suggest themselves to those skilled in the art and which are accomplished within the scope and coverage of the inventive concepts disclosed and claimed herein.

What is claimed is:

1. A tool joint connection, comprising:
a first tool joint having a first end connectable to a first pipe body, a second end, a bore extending entirely through the first tool joint from the first end to the second end, and a male connector portion having a lobed polygonal profile extending longitudinally from a distalmost end of the second end of the first tool joint toward the first end thereof, the lobed polygonal profile of the male connector portion having at least three sides interconnected by a corresponding number of lobes, each of the lobes being coextensive with adjacent sides of the lobed polygonal profile of the male connector portion; and
a second tool joint having a first end connectable to a second pipe body, a second end, a bore extending entirely through the second tool joint from the first end to the second end, and a female connector portion defining a bore section with a lobed polygonal profile extending longitudinally from a distalmost end of the second end of the second tool joint toward the first end thereof, the lobed polygonal profile of the female connector portion having at least three sides interconnected by a corresponding number of lobes, each of the lobes being coextensive with adjacent sides of the lobed polygonal profile of the female connector portion,
wherein the lobed polygonal profile of the male connector portion corresponds to the lobed polygonal profile of the female connector portion so the male connector portion of the first tool joint is non-rotatably receivable in the female connector portion of the second tool joint to form a connection between the first tool joint and the second tool joint,
wherein the male connector portion has an orientation lobe having a size substantially different from other lobes of the lobed polygonal profile of the male connector portion,
wherein the female connector portion has an orientation lobe having a size substantially different from other lobes of the lobed polygonal profile of the female connector and corresponding to the orientation lobe of the male connector portion to ensure a particular orientation of the first tool joint relative to the second tool joint when the first tool joint is connected to the second tool joint, and
wherein the first tool joint has a first communication link and wherein the second tool joint has a second communication link positioned to interface with one another when the first tool joint is connected to the second tool joint.

2. A tool joint connection, comprising:
a first tool joint having a first end connectable to a first pipe body, a second end, a bore extending entirely through the first tool joint from the first end to the second end, and a male connector portion having a lobed polygonal profile extending longitudinally from a distalmost end of the second end of the first tool joint toward the first end thereof, the lobed polygonal profile of the male connector portion having at least three sides interconnected by a corresponding number of lobes, each of the lobes being coextensive with adjacent sides of the lobed polygonal profile of the male connector portion; and a second tool joint having a first end connectable to a second pipe body, a second end, a bore extending entirely through the second tool joint from the first end to the second end, and a female connector portion defining a bore section with a lobed polygonal profile extending longitudinally from a distalmost end of the second end of the second tool joint toward the first end thereof, the lobed polygonal profile of the female connector portion having at least three sides interconnected by a corresponding number of lobes, each of the lobes being coextensive with adjacent sides of the lobed polygonal profile of the female connector portion, wherein the lobed polygonal profile of the male connector portion corresponds to the lobed polygonal profile of the female connector portion so the male connector portion of the first tool joint is non-rotatably receivable in the female connector portion of the second tool joint to form a connection between the first tool joint and the second tool joint, wherein the first tool joint has a first external threaded portion adjacent the male connector portion, wherein the second tool joint has a second external threaded portion adjacent the second end, and wherein the tool joint connection further comprises:

a coupling having a first internal threaded portion threadingly mateable with the first external threaded portion of the first tool joint and a second internal threaded portion threadingly mateable with the second external threaded portion of the second tool joint when the male connector portion of the first tool joint is received in the female connector portion of the second tool joint to form the connection between the first tool joint and the second tool joint.

3. The tool joint connection of claim 2, wherein the first threaded portion differs in pitch from the second threaded portion.

4. The tool joint connection of claim 2, wherein the lobed polygonal profile of the first tool joint and the lobed polygonal profile of the second tool joint are selected from the group consisting of triangular, square, pentagonal, hexagonal, and octagonal.

5. A joint, comprising:
a pipe body;
a first tool joint extending from one end of the pipe body and having a male connector portion with a lobed polygonal profile extending longitudinally from a distalmost end of the first tool joint toward the body, the lobed polygonal profile of the male connector portion having at least three sides interconnected by a corresponding number of lobes, each of the lobes being coextensive with adjacent sides of the lobed polygonal profile of the male connector portion; and
a second tool joint extending from an opposing end of the body and having a female connector portion defining a bore section with a lobed polygonal profile extending longitudinally from a distalmost end of the second tool joint toward the body, the lobed polygonal profile of the female connector portion having at least three sides interconnected by a corresponding number of lobes, each of the lobes being coextensive with adjacent sides of the lobed polygonal profile of the female connector portion, wherein the lobed polygonal profile of the male connector portion corresponds to the lobed polygonal profile of the female connector portion so the male connector portion of the first tool joint is non-rotatably receivable in the female connector portion of a second tool joint of a like joint to form a connection between the joints, wherein the male connector portion has an orientation lobe having a size substantially different from other lobes of the lobed polygonal profile of the male connector portion, wherein the female connector portion has an orientation lobe having a size substantially different from other lobes of the lobed polygonal profile of the female connector and corresponding to the orientation lobe of the male connector portion to ensure a particular orientation of the first tool joint relative to the second tool joint when the first tool joint of one joint is connected to the second tool joint of another joint, and wherein the first tool joint has a first communication link and the second tool joint has a second communication connected to the first communication link, the first communication link positioned to interface with the second communication link of the like joint when the joint is connected to the like joint.

6. The joint of claim 5, wherein each of the first tool joint, the body, and the second tool joint has a bore extending therethrough, and wherein each of the bores is axially aligned with one another.

7. The joint of claim 6, wherein the first tool joint has a first external threaded portion adjacent the male connector portion, wherein the second tool joint has a second external threaded portion adjacent the second end, and wherein the joint further comprises:

a coupling having a first internal threaded portion threadingly mateable with the first external threaded portion of the first tool joint and a second internal threaded portion threadingly mateable with the second external threaded portion of a like tubular joint when the male connector portion of the first tool joint is received in the female connector portion of the like tubular joint.

8. The tubular string of claim 7, wherein the first threaded portion differs in pitch from the second threaded portion.

9. The tubular joint of claim 5, wherein the lobed polygonal profile of the first tool joint and the lobed polygonal profile of the second tool joint are selected from the group consisting of triangular, square, pentagonal, hexagonal, and octagonal.

10. A tubular string, comprising:
a plurality of tubular joints, each of the tubular joints comprising:
a pipe body;
a first tool joint extending from one end of the pipe body and having a bore extending therethrough and a male connector portion with a lobed polygonal profile extending longitudinally from a distalmost end of the first tool joint toward the pipe body, the lobed polygonal profile of the male connector portion having at least three sides interconnected by a corresponding number of lobes, each of the lobes being coextensive with adjacent sides of the lobed polygonal profile of the male connector portion; and
a second tool joint extending from an opposing end of the pipe body and having a bore extending therethrough and a female connector portion defining a bore section with a lobed polygonal profile extending longitudinally from a distalmost end of the second tool joint toward the pipe body, the lobed polygonal profile of the female connector portion having at least three sides interconnected by a corresponding number of lobes, each of the lobes being coextensive with adjacent sides of the lobed polygonal profile of the female connector portion, wherein the lobed polygonal profile of the male connector portion corresponds to the lobed polygonal profile of the female connector portion so the male connector portion of the first tool joint of one tubular joint is non-rotatably received in the female connector portion of the second tool joint of another tubular joint to form a connection between the first tool joint of the one tubular joint and the second tool joint of the other tubular joint, wherein the male connector portion has an orientation lobe having a size substantially different from other lobes of the lobed polygonal profile of the male connector portion, wherein the female connector portion has an orientation lobe having a size substantially different from other lobes of the lobed polygonal profile of the female connector and corresponding to the orientation lobe of the male connector portion to ensure a particular orientation of the first tool joint relative to the second tool joint, and wherein the first tool joint of the of the plurality of tool joints has a first communication link and wherein the second tool joint of the plurality of tool joint has a second communication link connected to the first communication link, the first communication link of the one tubular joint is interfaced with the second communication link of the other tubular joint.

11. A tubular string, comprising:

a plurality of tubular joints, each of the tubular joints comprising:
  a pipe body;
  a first tool joint extending from one end of the pipe body and having a bore extending therethrough and a male connector portion with a lobed polygonal profile extending longitudinally from a distalmost end of the first tool joint toward the pipe body, the lobed polygonal profile of the male connector portion having at least three sides interconnected by a corresponding number of lobes, each of the lobes being coextensive with adjacent sides of the lobed polygonal profile of the male connector portion; and a second tool joint extending from an opposing end of the pipe body and having a bore extending therethrough and a female connector portion defining a bore section with a lobed polygonal profile extending longitudinally from a distalmost end of the second tool joint toward the pipe body, the lobed polygonal profile of the female connector portion having at least three sides interconnected by a corresponding number of lobes, each of the lobes being coextensive with adjacent sides of the lobed polygonal profile of the female connector portion, wherein the lobed polygonal profile of the male connector portion corresponds to the lobed polygonal profile of the female connector portion so the male connector portion of the first tool joint of one tubular joint is non-rotatably received in the female connector portion of the second tool joint of another tubular joint to form a connection between the first tool joint of the one tubular joint and the second tool joint of the other tubular joint, wherein the first tool joint has a first external threaded portion adjacent the male connector portion, wherein the second tool joint has a second external threaded portion adjacent the second end, and wherein the tubular string further comprises:
  a coupling having a first internal threaded portion threadingly mated with the first external threaded portion of the first tool joint and a second internal threaded portion threadingly mated with the second external threaded portion of the second tool joint.

12. The tubular string of claim 11, wherein the first threaded portion differs in pitch from the second threaded portion.

13. The tubular joint of claim 11, wherein the lobed polygonal profile of the first tool joint and the lobed polygonal profile of the second tool joint are selected from the group consisting of triangular, square, pentagonal, hexagonal, and octagonal.

* * * * *